(12) United States Patent
Jagadish et al.

(10) Patent No.: US 11,494,424 B2
(45) Date of Patent: Nov. 8, 2022

(54) SYSTEM AND METHOD FOR ARTIFICIAL INTELLIGENCE BASED DATA INTEGRATION OF ENTITIES POST MARKET CONSOLIDATION

(71) Applicant: Tata Consultancy Services Limited, Mumbai (IN)

(72) Inventors: Suhas Jagadish, Bangalore (IN); Vijay Muttur, Bangalore (IN); Ankur Khatri, Bangalore (IN); Spandan Mahapatra, Atlanta, GA (US); Monika Shalabh Garg, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 274 days.

(21) Appl. No.: 15/929,626

(22) Filed: May 13, 2020

(65) Prior Publication Data
US 2020/0387529 A1 Dec. 10, 2020

(30) Foreign Application Priority Data
May 13, 2019 (IN) .............................. 201921019064

(51) Int. Cl.
*G06F 7/00* (2006.01)
*G06F 16/33* (2019.01)
(Continued)

(52) U.S. Cl.
CPC .......... *G06F 16/3344* (2019.01); *G06F 40/40* (2020.01); *G06N 5/04* (2013.01);
(Continued)

(58) Field of Classification Search
CPC .............. G06F 16/3344; G06F 16/252; G06F 16/2379; G06F 40/40; G06F 40/295;
(Continued)

(56) References Cited

U.S. PATENT DOCUMENTS 6,327,571 B1 * 12/2001 Khayat .............. G06Q 30/0203
705/7.32
10,303,999 B2 * 5/2019 Hertz .................... G06K 9/6259
(Continued)

FOREIGN PATENT DOCUMENTS

KR 10-2020-0010624 1/2020

OTHER PUBLICATIONS

Dong, X.L. et al. "Data Integration and Machine Learning: A Natural Synergy," retrieved from http://www.vldb.org/pvldb/vol11/p2094-dong.pdf. (4 pages.).
(Continued)

*Primary Examiner* — Mohammad A Sana
(74) *Attorney, Agent, or Firm* — Finnegan, Henderson, Farabow, Garrett & Dunner LLP

(57) ABSTRACT

This disclosure relates generally to data integration, and more specifically to artificial intelligence based data integration of entities post market consolidation. The method includes extracting, using one or more text mining models, metadata associated with at least one category of each of the participating entities of the deal, from data sources associated with the entities. The disclosed system dynamically configures an assessment for the at least one category based on the metadata by using a set of Natural Language Processing (NLP) rules. The assessment includes parameters associated with the data integration of the entities. Response to the assessment is obtained from users belonging to the entities. An artificial intelligence (AI) based processing model assigns a similarity score to the responses, where the similarity score is indicative of extent of match between distinct responses obtained from the entities. A recommendation engine recommends a data integration model based on the similarity score.

17 Claims, 4 Drawing Sheets

(51) Int. Cl.
  *G06N 20/00* (2019.01)
  *G06Q 10/10* (2012.01)
  *G06F 40/40* (2020.01)
  *G06N 5/04* (2006.01)
  *G06Q 50/18* (2012.01)

(52) U.S. Cl.
  CPC .......... *G06N 20/00* (2019.01); *G06Q 10/105* (2013.01); *G06Q 50/18* (2013.01)

(58) Field of Classification Search
  CPC ....... G06F 40/279; G06F 40/35; G06N 20/00; G06N 5/04; G06Q 10/105; G06Q 50/18
  See application file for complete search history.

(56) References Cited

U.S. PATENT DOCUMENTS

| | | | |
|---|---|---|---|
| 2017/0075918 A1 | 3/2017 | Bates-Haus et al. | |
| 2018/0240352 A1* | 8/2018 | Thomas | G06F 40/279 |
| 2020/0302296 A1* | 9/2020 | Miller | G06N 20/20 |

OTHER PUBLICATIONS

Li, Y. et al. (Nov. 2015.) "Data Integration in Machine Learning," *IEEE International Conference on Bioinformatics and Biomedicine (BIBM)*, Nov. 18-21, 2019, San Diego, CA; 8 pages.
Tiwari, A. "How machine learning is accelerating data integration?" retrieved from https://www_abhishek-tiwari.com/how-machine-learning-is-accelerating-data-integration. (7 pages.).

* cited by examiner

SYSTEM AND METHOD FOR ARTIFICIAL INTELLIGENCE BASED DATA INTEGRATION OF ENTITIES POST MARKET CONSOLIDATION

PRIORITY CLAIM

This U.S. patent application claims priority under 35 U.S.C. § 119 to: India Application No. 201921019064, filed on May 13, 2019. The entire contents of the aforementioned application are incorporated herein by reference.

TECHNICAL FIELD

The disclosure herein generally relates to integration of data received from multiple entities, and, more particularly, to method and system for artificial intelligence (AI) based data integration for providing recommendations in information technology (IT) systems during, for example post market consolidation scenarios such as post-merger and acquisition deals.

BACKGROUND

Due to rapid digitalization and adoption of Industry 4.0 principles, industries across various sectors are witnessing disruption. Such disruption has led to market consolidation and growth of newer business models. Merger and/or acquisition are an integral part of such newer growth plans in various industries across varied sectors. Once the respective parties (or entities) looking out for merger and/or acquisition realize synergies therebetween, they tend to get into merger and/or acquisition.

Pursuant to the decision of merger and/or acquisition by the respective parties, post-merger and/or acquisition (M&A) tasks require the parties to integrate complex set of business and technology activities during merging and/or acquisition to work in tandem and achieve the goal of integration.

The business integration post M&A is a challenging task due to various reasons. Examples of such challenges include, but are not limited to, lack of availability of the right people for knowledge transfer, knowledge gaps in understanding processes of the parties (or the companies), need for a common repository to handle all M&A related activities, need to reinvent the wheel with regard to integration scenarios, knowledge of older technologies and non-availability of a tool to track issues pertaining to the integration, and so on.

Conventional technologies available for M&A includes popular project planning systems that enables only tracking and controlling the execution plan of the M&A. However, post-merger and/or acquisition, integration is complex as it involves multiple activities including, but not limited to, strategy definition, integration management office and execution. Additionally, conventional M&A process is implemented using unsophisticated tools that do not offer required visibility, transparency, prescriptive analytics and reusable integration assets, and hence such systems are not scalable for the new age digital paradigm. Moreover, existing M&As techniques cannot be reused if there are acquisitions in the same domain or business due to information silos and diverse technology landscape. With available tools, transitioning and project management is manual, wherein the use of best practices encountered in previous integrations are very difficult to retrieve and recreate in current systems.

Further, post M&A, the data and/or plans stored at data sources tend to lose authenticity when they change hands leading to a risk of data loss.

SUMMARY

Embodiments of the present disclosure present technological improvements as solutions to one or more of the above-mentioned technical problems recognized by the inventors in conventional systems. For example, in one embodiment, a processor implemented method for data integration of entities post market consolidation is provided. The method includes extracting, using one or more text mining models, metadata associated with at least one category of each entity of the plurality of entities participating in the deal via one or more hardware processors, from a plurality of data sources associated with the plurality of entities, the plurality of data sources accessible through a cloud infrastructure. Further, the method includes dynamically configuring, via the one or more hardware processors, an assessment for the at least one category based on the metadata by using a set of Natural Language Processing (NLP) rules, the assessment comprising a plurality of parameters associated with the data integration of the plurality of entities, wherein the assessment being administered to a plurality of users from the plurality of entities to obtain a plurality of responses to the assessment from the plurality of users. Furthermore, the method includes assigning, by using an artificial intelligence (AI) based processing model, a similarity score to the plurality of responses, via the one or more hardware processors, the similarity score indicative of extent of match between distinct responses obtained from the plurality of entities. Also, the method includes recommending, by a recommendation engine, a data integration model from amongst a plurality of data integration models based on the similarity score, via the one or more hardware processors.

In another aspect, a system for data integration of entities post market consolidation is provided. The system includes one or more memories and one or more hardware processors, the one or more memories coupled to the one or more hardware processors, wherein the one or more hardware processors are configured to execute programmed instructions stored in the one or more memories, to extract, using one or more text mining models, metadata associated with at least one category of each entity of the plurality of entities participating in the deal, from a plurality of data sources associated with the plurality of entities, the plurality of data sources accessible through a cloud infrastructure. Further, the one or more hardware processors are configured by the instructions to dynamically configure an assessment for the at least one category based on the metadata by using a set of Natural Language Processing (NLP) rules, the assessment comprising a plurality of parameters associated with the data integration of the plurality of entities, wherein the assessment being administered to a plurality of users from the plurality of entities to obtain a plurality of responses to the assessment from the plurality of users. Furthermore, the one or more hardware processors are configured by the instructions to assign, by using an AI based processing model, a similarity score to the plurality of responses, the similarity score indicative of extent of match between distinct responses obtained from the plurality of entities. Moreover, the one or more hardware processors are configured by the instructions to recommend, by a recommendation engine, a data integration model from amongst a plurality of data integration models based on the similarity score.

In yet another aspect, a non-transitory computer readable medium for a method for AI based data integration of entities post market consolidation is provided. The method includes extracting, using one or more text mining models, metadata associated with at least one category of each entity of the plurality of entities participating in the deal via one or more hardware processors, from a plurality of data sources associated with the plurality of entities, the plurality of data sources accessible through a cloud infrastructure. Further, the method includes dynamically configuring, via the one or more hardware processors, an assessment for the at least one category based on the metadata by using a set of Natural Language Processing (NLP) rules, the assessment comprising a plurality of parameters associated with the data integration of the plurality of entities, wherein the assessment being administered to a plurality of users from the plurality of entities to obtain a plurality of responses to the assessment from the plurality of users. Furthermore, the method includes assigning, by using an artificial intelligence (AI) based processing model, a similarity score to the plurality of responses, via the one or more hardware processors, the similarity score indicative of extent of match between distinct responses obtained from the plurality of entities. Also, the method includes recommending, by a recommendation engine, a data integration model from amongst a plurality of data integration models based on the similarity score, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
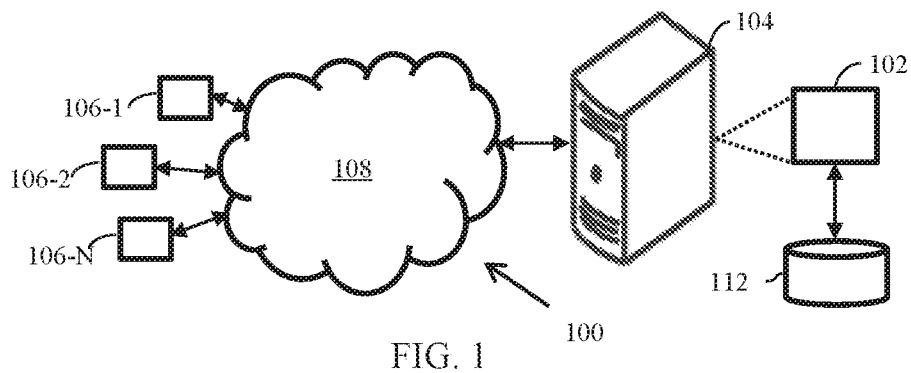
FIG. 1 illustrates a network environment implementing a system for AI based data integration of entities post market consolidation, according to some embodiments of the present disclosure.

Typically, post finalizing of a deal between parties or entities (such as companies, organizations, firms, institutions, and so on), revenues and other financial records/tasks of the participating entities are combined from business perspective. This means that the various finance, human resource (HR), administrative tasks and Indirect procurement functions of the involved parties have to be merged. Merging of aforementioned tasks involve merging and activation of IT capabilities of the concerned entities. Typically, M&A is accomplished once the IT capabilities of the concerned entities are merged and activated. Since the participating entities may be operating/utilizing different tools and/or platforms for different functions, post M&A, movement of various important functions of one entity onto the technology landscape another entity is necessitated.

Typically, during data integration process post commencement of the deal, the data is unstructured (that is derived from a large number of internal and/or external sources associated with the participating entities). For instance, the data may be related to IT infrastructure, finance operation, HR functions, hierarchy followed in the respective entities, and so on and so forth. Moreover, the data associated with each of the functions may have a specific and distinct structure including, for example, certain schema, tables, certain records, and so on. Conventional systems used for data integration post deal commencement have limited capability in interpreting the unstructured data associated with the participating entities to provide meaningful alternatives. Additionally, because of limitations in interpreting unstructured data, the conventional systems are not adaptable (to other industries) and scalable (to dynamically handle the volumes). Another limitation of the known data integration systems is that they lack customized recommendation capabilities according to the participating entities and/or the data thereof.

Various embodiments described herein includes a method and a system for data integration of multiple entities post market consolidation by using an artificial intelligence (AI) based processing model. The system described herein extracts metadata from data sources associated with the participating entities using data mining models. and dynamically configuring an assessment using the extracted metadata. The assessment is administered to multiple stakeholders from the participating entities and their response is recorded. An extent of match between the responses is determined using the AI based processing model, and based on the match, a model for data integration is selected. The AI based processing model is pretrained using supervised learning, and hence enables seamless integration between corresponding data associated with the participating entities. Moreover, the data associated with the multiple entities is stored in a cloud based infrastructure and hence is easily accessible to all the users and/or stakeholders. The disclosed system fosters single sources of truth for data integration, thereby enabling single version of truth. A unique technical advantage of using single source of truth is that it leads to deduplication of data, thereby providing productivity gains with respect to memory utilization. The deduplication of data further facilitates seamless tracking. In addition, the single version of truth for data integration enables transfer learning for training the disclosed system.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 5, where similar reference characters denote corresponding features consistently throughout the figures, there are shown preferred embodiments and these embodiments are described in the context of the following exemplary system and/or method.

FIG. 1 illustrates an example network implementation 100 of a system 102 for artificial intelligence (AI) based data integration of entities post market consolidation in accordance with an example embodiment. In an embodiment, the system 102 is capable of providing recommendations to entities participating in a deal (such as a merger and/or acquisition) for data integration. For the brevity of description, hereinafter, the entities participating in the deal may be referred to as 'participating entities'.

The term 'data integration of participating entities' herein refers to integration of various functions or tasks or actions that can be performed by the participating entities for integration of their business functions, including but not limited to, IT functions, finance, human resource, and so on. In the present embodiment, the data integration performed by the system 102 includes operation on the data of respective entities, wherein such operations includes but are not limited to, clone, purge and merge, clone-acquire, develop new systems, develop interfaces, pick best of breed and purge, and combinations thereof. In an embodiment, the system 102 may be configured on a server for enabling data integration between the entities.

Although the present disclosure is explained considering that the system 102 is implemented on a server, it may be understood that the system 102 may instead be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112. In an embodiment, the data repository may store training and/or validation dataset. In an embodiment, the data set may include labelled data to enable supervised learning of an AI based processing model (described later) for the recommendation of the data integration modes (or models).

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to operate as a loosely coupled device to a smart computing environment. The components and functionalities of the system 102 are described further in detail with reference to FIGS. 2-5.

Figure 2:
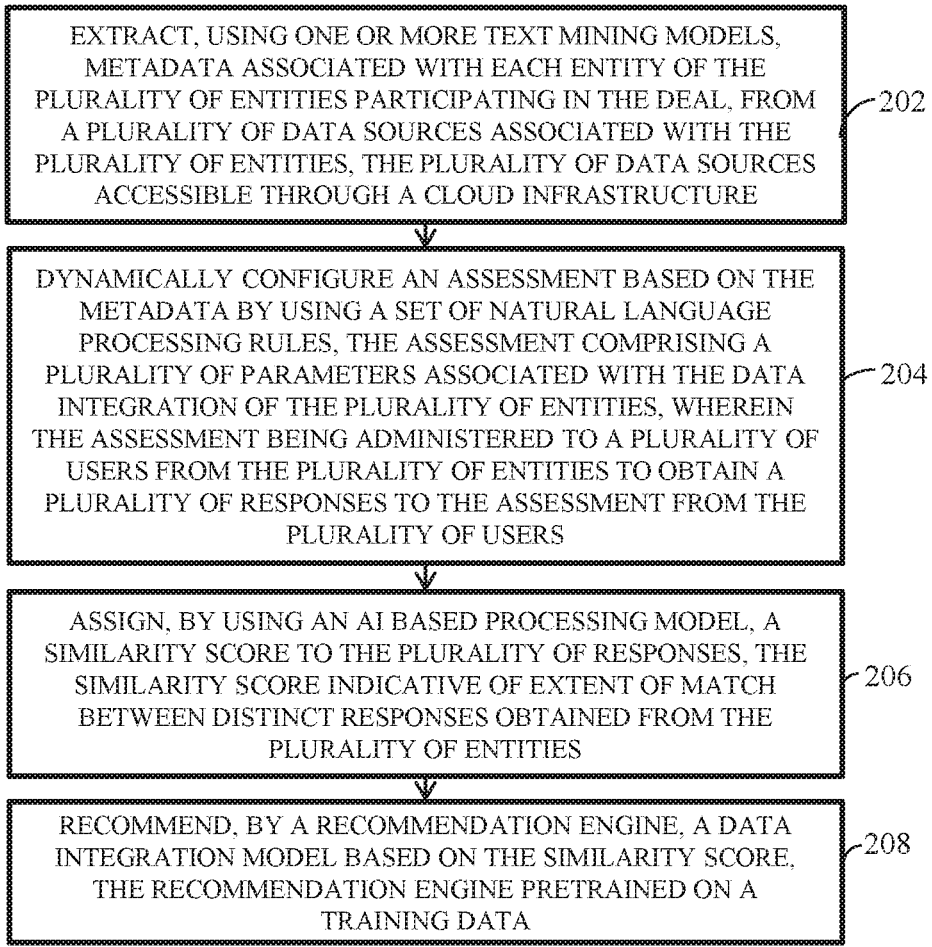
FIG. 2 is a flow diagram of a method for AI based data integration of entities post market consolidation according to some embodiments of the present disclosure.

FIG. 2 is a flow diagram for a method for AI based data integration of entities post market consolidation in accordance with some embodiments of the present disclosure. The method 200 depicted in the flow chart may be executed by a system, for example, the system, 102 of FIG. 1. In an example embodiment, the system 102 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

Post commencement of a deal for market consolidation involving a plurality of entities, said entities need to integrate their respective functions so that the combined entity formed as a result of market consolidation can operate effectively. The participating entities may be associated with certain sources of data (also referred to as data sources) that may be internal to said entities. For instance, each of the participating entities may include sources of storing data related to entities revenues, financial data such as order to cash (O2C), procure to pay (P2P) and such other entity specific data. Such data from the participating entities is to be integrated for effective operations of the merged (or combined) entity. The disclosed method 200 illustrates various steps involved in integration of data of the participating entities in a dynamic manner using AI based processing model. The method 200 for AI based data integration is described further with reference to 202-208 below.

Referring to FIG. 2, at 202, the method 200 includes extracting metadata associated with at least one category of each entity of the plurality of entities participating in the deal. The at least one category may include, for example, people, processes, technologies and software applications of the plurality of the entities. The metadata may include, for example, entities' profit and loss details, number of customers, market valuation, profit margin, industry type, and so on and so forth. The metadata may be extracted using one or more text mining models, including, but not limited to, Named Entity Recognition, Entity Resolution (Word-sense Disambiguation algorithm), and Key Entity Detection (Bayesian Reasoning).

The plurality of data sources may be accessible through a cloud infrastructure. In an embodiment, the metadata may be systematically stored in a database classified based on the people, the processes, the technologies (e.g. unified datalake with primary and foreign key definitions) and the software applications to be accessible based on function. The access to database is granted as a single version of truth. Systematically storing the metadata leads to productivity gains to efficient memory utilizations, faster time to correlate and drive data driven decision making.

At 204, the method 200 includes dynamically configuring one or more assessments based on the extracted metadata by using a set of Natural Language Processing (NLP) rules. In an embodiment, the one or more assessments may be directed towards the categories including, but not limited to, process, technology, and so on. For instance, the assessments for the category process may include various scenarios such as merging B2B and B2C order management steps. The assessments directed towards the category 'technology' may include information on whether to retire or retain or renew an application or not. The assessment for each category may be administered to a plurality of users from the plurality of entities to obtain a plurality of responses to the assessment. Each of the plurality of users may provide response to the assessments and the responses so obtained may be recorded in the database, for instance the repository 112.

Herein, dynamically configuring the assessment refers to automatically and dynamically generating a set of queries for specific users in real-time. The set of queries of the assessment may be posed to each user in a manner that the user's response decides the subsequent questions. In an embodiment, a skip logic may be utilized for driving the assessment. For example, a query posed to the user may be "Are your application a. Cloud Native b. On Premise c. Hybrid". If the response from the user is: a. Cloud Native, the owing to skip logic, only the cloud assessment queries may be administered to the user. For instance, subsequent query may be: "Which is your preferred Cloud platform? a. AWS b. GCP c. Azure d. Others". In an embodiment, the skip logic may be configured for dynamically configuring the assessment by defining a set of rules for each of the categories.

In an example embodiment, the system 102, via the UI of the system 102, may enable the plurality of users with different roles to access the system. The plurality of users, may include, but are not limited to an administrator, a deal owner, an integration lead, global head of M&A, and so on. It will be understood that the plurality of users represents the users authorized to get involved in the process of merger and/or acquisition deal. In an example scenario, the system may enable a secure workflow (access-controlled authorization) and approval process for accessing the UI.

The responses to the assessment may facilitate the system 102 to capture a plurality of unique parameters associated with the data integration of the participating entities. Examples of the plurality of parameters may include, but are not limited to, inventory of applications, number of processes, number of tracks, number of applications, volume of transactions, incremental users per month, number of integration backlogs, Transition Service Agreement (TSA) timelines, and so on.

At 206, the method 200 includes assigning, by using an AI based processing model, a similarity score to the plurality of responses. In an embodiment, the similarity score is derived from the text similarity models such as, but not limited to, combination of term frequency-inverse document frequency (TFIDF) or pretrained models like Global vectors for word representation (GloVe) and Cosine similarity, word2vec. The similarity score is a cumulative score of various process and technology level assessment scores captured using text mining and NLP capabilities for structured and unstructured data. Particularly, the system 102 compares the responses to similar queries posed to the users at each of the participating entities. Based on a comparison of responses received from each of the participating entities, the system 102 may compute the similarity score indicative of extent of match between distinct responses obtained from the plurality of entities. For instance, assume that for a query "Do you store litigation applicable documents and email?", the response received from the entity is "Yes". The follow-up query may be "Does it allow retrieval of these documentation?". Assuming that the response is "Yes", the subsequent follow-up query may be "What is the application used to do this?", and the response may be "Symantec Enterprise Vault". Based on the responses to same questions by "entity B", the similarity score may be derived. The AI based processing model may compare the responses received from the entities A and B and determine a match between said responses.

In an embodiment, the AI based processing model may utilize an unsupervised learning, for example cosine similarity. The AI based processing model may take the response as input (unstructured data), tokenize and convert them into vectors of features, and then use various method to arrive at similarity by calculating the degree or distance between the compared responses.

In an alternate embodiment, the AI based processing model may be trained using K-means cluster algorithm. The k-means clustering algorithm aims to find the set of k-clusters in the dataset such that every data point is assigned to the closest center, and the sum of the distances of all such assignments is minimized.

In yet another embodiment, the AI based processing model utilizes transfer learning for training. Transfer learning refers to a process of a machine storing the information used in properly or improperly solving one problem to solve another problem of the same or similar nature as the first. Transfer learning may also be known as "inductive learning". For example, the AI based processing model may receive an input comprising a set of parameters previously derived during a previous deal (for instance in some other technology area than that of the current deal). The AI based processing model implementing the transfer learning may utilize said plurality of parameters for assigning a similarity score to the responses in the current deal. In an example scenario, the AI based processing model may receive inputs (or learnings) from Hi-Tech Industry and apply the same into Life sciences Industry i.e., typical steps required to go asset lite can be learned from Hi-Tech and applied in the data integration efforts of entities in Lifesciences industry.

At 208, the method 200 includes recommending, by a recommendation engine (not shown in figures), a data integration model based on the similarity score. In an embodiment, the recommendation engine may embody a supervised learning model. The supervised learning model may be trained to learn the patterns associated with the output. For any new input fed to the trained supervised learning model, it can predict the output. In an embodiment, for each category of functions, such as processes and technology, a historical data may be utilized to train the AI based processing model. Past decisions (options recommended) may be used to label the data set. The recommendation engine may be tuned by using hyperparameter tuning to enhance the accuracy of the model. Additionally, feature engineering and training data curation may be applied to provide good quality model. In an embodiment, the recommendation engine receives the plurality of parameters derived from the response's to the assessments, and feeds the plurality of parameters to text similarity models. The text similarity models involve various attributes or variables that helps to derive decisions or recommendations. Examples of such attributes or variables may include, but are not limited to, application inventory (e.g: number of HR applications, Finance applications, and so on), Volume of transactions (e.g: 10K/Day on a business day across the geography), number of processes (e.g: 12 Tracks across 4 domains), number of integration backlogs (e.g: 5 acquisitions every year, 10 backlogs for integration), standard process steps (e.g: automation vs bespoke point solution), assessment questionnaire (e.g: expiry of licenses, SaaS product landscape), business scalability objectives (e.g: number of active users, number of incremental users per month). The recommendations uniquely defines, based on the similarity score, as to how the landscape of the merged entity should appear. For example, for a query "DB systems used", if similarity score of responses from the participating entities is 0.85, then the system may select Decision Path 1 (namely, Merging the DB systems of the participating entities). If however, the similarity score of responses from both the participating entities is 0.30, then the system may select a Decision Path 2 (namely, Purging one system and keeping another). Hence, based upon the similarity score a decision path may be selected for recommendation.

In an embodiment, the plurality of data integration models that may be recommended by the system 102 based on the similarity score may include, but are not limited to, a clone model, a purge and merge model, a clone-acquire model, a develop new systems model, a develop interfaces model, a pick best of breed and purge model, and combinations thereof. For example, a Clone, Purge and Merge model may be recommended when the similarity score is greater than 70. This may happened, for example, when it is determined that one company's set of business processes and IT landscape is better suited to meet the strategic vision of the combined entity (formed, for example, by acquisition of one entity by another entity).

In another example scenario, a Clone-Acquire, Purge and Merge model may be recommended when the similarity score is between 40 and 70. This may happen, for example, when the acquired system component provides enhanced functionality and improves overall capabilities of the business.

In yet another example scenario, a Acquire and Merge model may be recommended when the similarity score is between 50 and 80. This may happen, for example, when the acquired companies processes and system components provides enhanced functionality and improves overall capabilities of the business.

In still another example scenario, a Develop New Systems model may be recommended when the similarity score is less than 20. This may happen, for example, when fair degree of process change and new functionalities are required.

In still another example scenario, a Develop Interfaces model may be recommended when the similarity score is less than 10. This may happen, for example, when technology stack and operations environment of the merging companies are disparate.

In still another example scenario, a Pick Best of Breed and Purge model may be recommended when the similarity score is between 30 and 40. This may happen, for example, when required functionality is best met by the integration and the implementation is not too complex.

Figure 3:
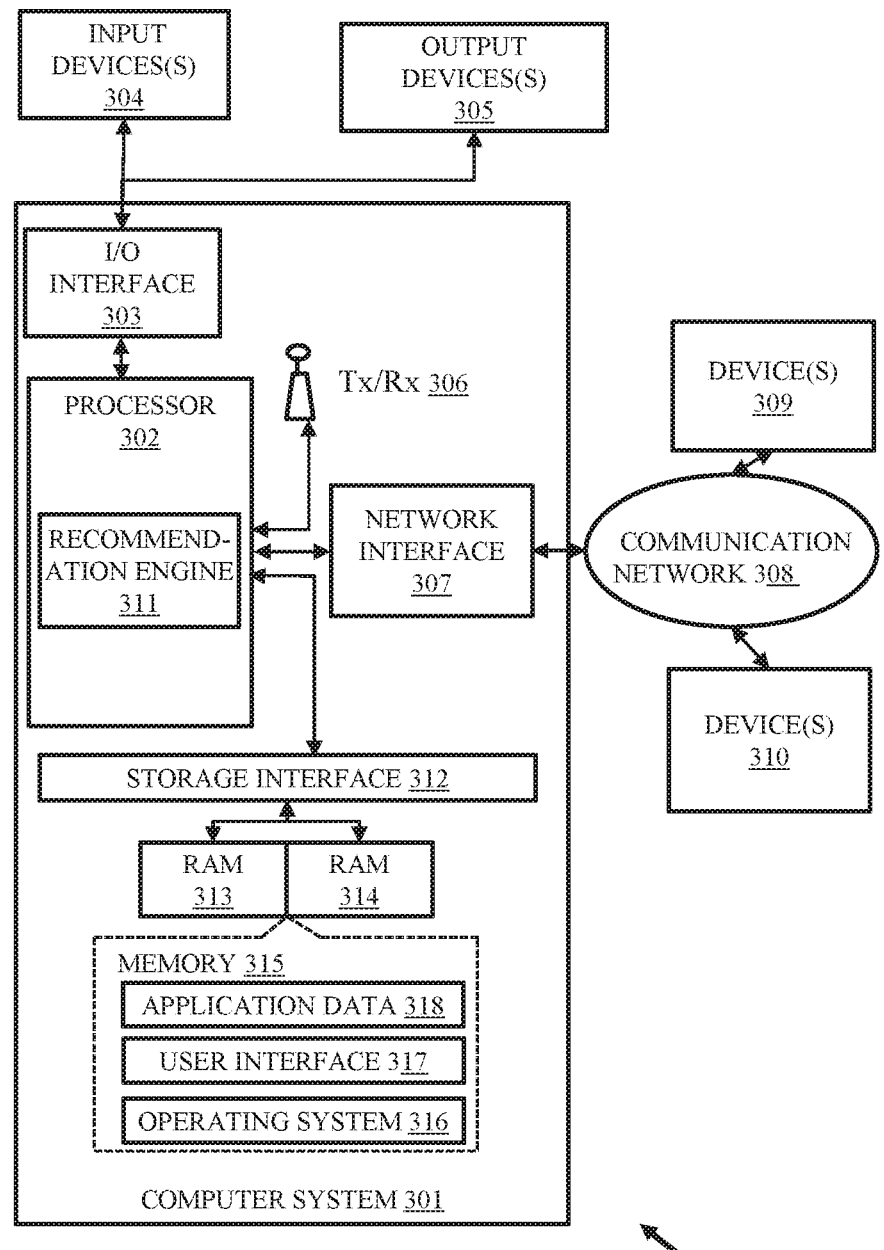
FIG. 3 block diagram of an exemplary computer system for implementing embodiments consistent with the present disclosure.

An exemplary computer system for performing the method described in FIG. 2 is illustrated and explained further with reference to FIG. 3.

FIG. 3 is a block diagram of an exemplary computer system 301 for implementing embodiments consistent with the present disclosure. The computer system 301 may be implemented in alone or in combination of components of the system 102 (FIG. 1). Variations of computer system 301 may be used for implementing the devices included in this disclosure. Computer system 301 may comprise a central processing unit ("CPU" or "hardware processor") 302. The hardware processor 302 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™ Xeon™, Celeron™ or other line of processors, etc. The processor 302 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

As illustrated, the computer system 301 runs a recommendation engine 311 on its processor 302. The recommendation engine 311 includes a set of computer programs specifically adapted to utilize the responses received from the users of participating entities to compile recommendations for data integration by employing one or more stored responses and recommendation algorithms that are: (i) dedicated to recommendation generation; (ii) recommendations for data integration models for post deal commencement, and (iii) which provide rapid convergence on parameters that can be utilized for determining a preferred data integration model.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 309 and 310. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 316, user interface application 317, user/application data 318 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like. Herein, the memory devices may offer TEE storage for storing the programmed instructions and data pertaining to the biometric verification.

In some embodiments, computer system 301 may store user/application data 418, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

Figure 4:
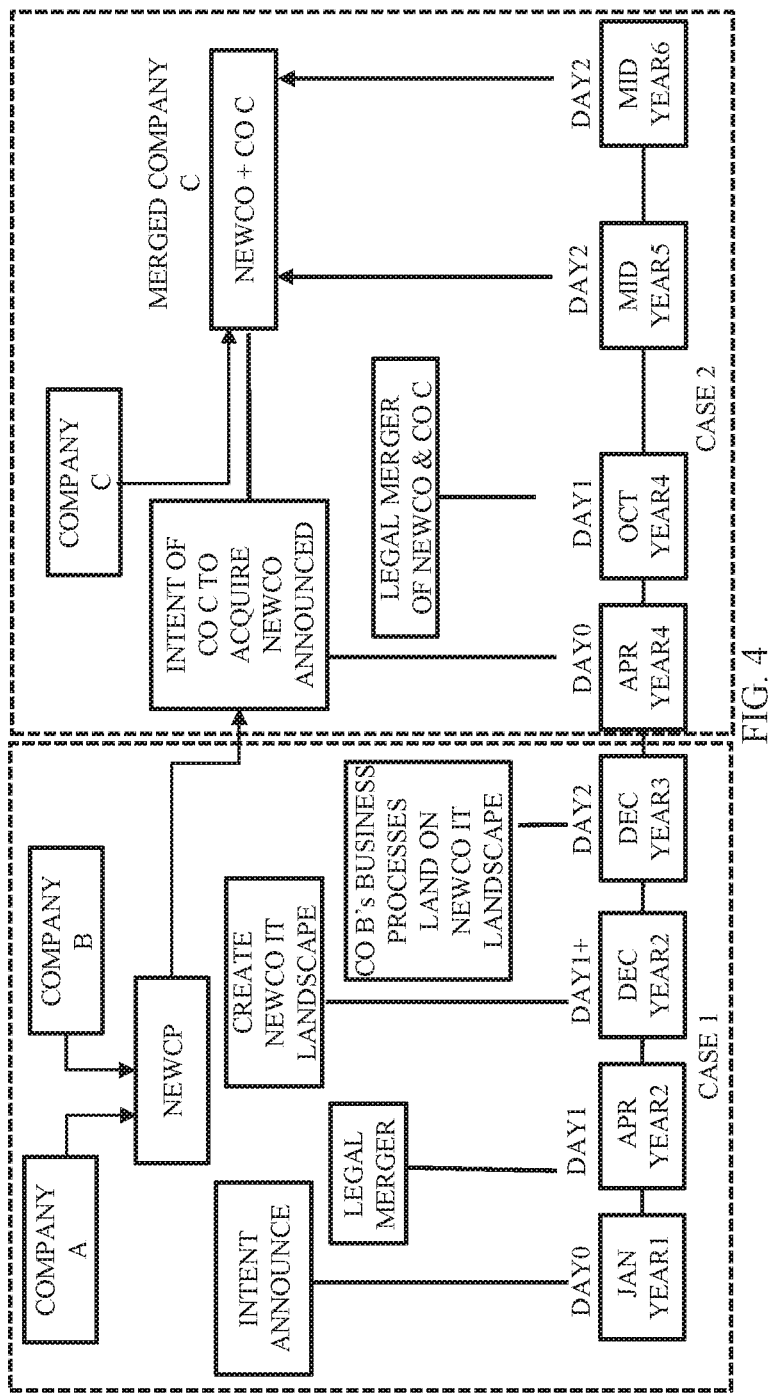
FIG. 4 illustrates a use case for the process of post-merger & acquisition integration for integration of multiple entities, in accordance with some embodiments of the present disclosure.

FIG. 4 illustrates a use case for the process of post-merger & acquisition integration for integration of multiple entities, in accordance with some embodiments of the present disclosure. Upon announcement of a Company A buying Company B, the knowledge of the M&A becomes public and the event is known as 'Day 0'. Post the announcement the companies A and B work towards the integration methodology. Further, after the announcement of Day 0, the most important milestone is, Day 1, the day on which the two companies merge and become one legal entity. On Day 1, the revenues and other financial parameters of the combined entity will be seen as one. Further, accomplishing Day 1 certain back end IT capabilities also need to be activated. Generally at Day 1—Finance, HR, Admin and Indirect procurement functions merge. On stage of Day 1, the combined entity can report its financials accurately, but it may be performing its other activities like Order to Cash (O2C) and Procure to pay (P2P) on a Leased IT environment from Company B (the company that has been acquired by Company A). Further, movement of these important functions on to the Technology landscape of Company A the integration has to be done. The milestone of making this technology merger happen is called the Day 2. At Day 2 Company B has merged completely into Company A and they work as one entity.

The process of acquisitions between the Company NewCo and Company C is similar to merger process between two entities, as described above. On Day 0, the intent of Company C to acquire new company is announced. Post the announcement the two companies sit down together and work on the integration methodology. Further, after the announcement of Day 0, the most important milestone is Day 1, the day on which the two companies merge and become one legal entity. On Day 1 the revenues and other financial parameters of the combined entity will be seen as one. Further, accomplishing Day 1 certain back end IT capabilities also need to be activated.

Generally at Day 1—Finance, HR, Admin and Indirect procurement functions merge. Further, at the stage of Day 1, the combined entity can report its financials accurately but it may be performing its other activities like Order to Cash (O2C) and Procure to pay (P2P) on a Leased IT environment from Company NewCo (the company that has been acquired by Company C). Further, to move these important functions on to the Technology landscape of Company C the integration has to be done. The milestone of making this technology merger happen is called the Day 2. On Day 2 Company Newco has merged completely into Company C and they work as one entity.

Figure 5:
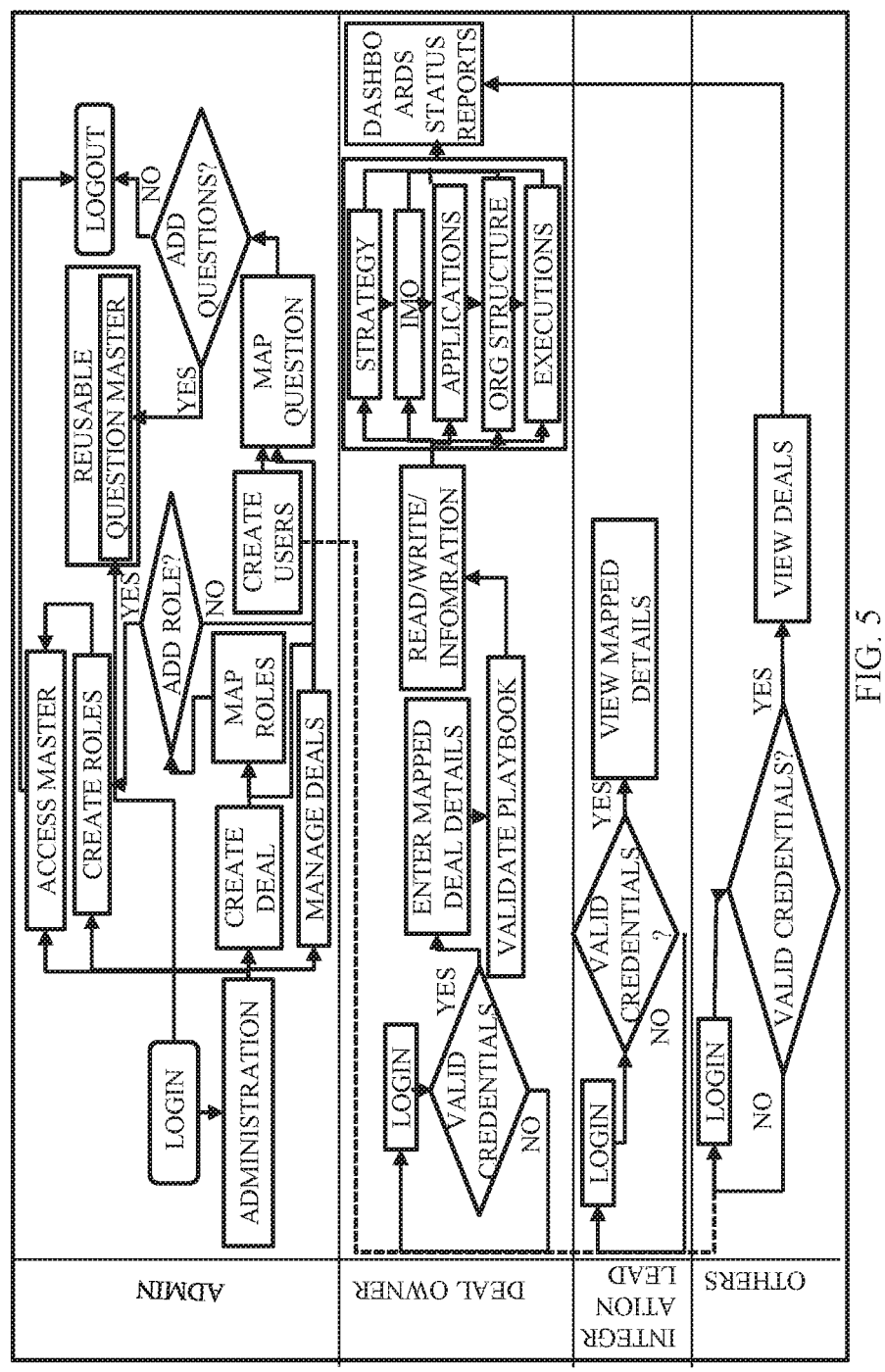
FIG. 5 illustrates a use case of process flow diagram for the Post-Merger and Acquisition Integration Platform for integration of multiple entities, in accordance with some embodiments of the present disclosure.

The process flow of various roles of the system 102 in defining responsibilities to generate integration model, is further explained in conjunction with the use case depicted in FIG. 5.

FIG. 5 illustrates a use case of process flow diagram for the Post-Merger and Acquisition Integration Platform for integration of multiple entities, in accordance with some embodiments of the present disclosure.

Referring to the FIG. 5, in an embodiment, the proposed system (for example, the system 102 of FIG. 1) allows multiple users with different roles to access the system, wherein the different users include an administrator, deal owner, integration lead and global head M&A. The Admin logins into the application and has the access to create a deal, wherein the admin can create a deal, map roles, create users and map questions to the deal. Further, the admin has an option to add roles and questions, through the Role Master and Question Master functions respectively. Further, the admin can also manage already created deals and perform all the functions available while creating a deal. Further, the admin can directly create generic and deal specific roles through the role master function. Further, the admin can add general questions to the question master. Further, the admin can define what screen each role accesses through access master function. Further, once the users are created by the admin in a deal, a deal owner with valid credentials can login and enter deal specific information, wherein the deal owner can validate the playbook for accuracy in questionnaire and can read/write information in Strategy, IMO, Organization structure, Application inventory and execution plans. And finally, a Dashboard with status reports can be setup and used. The integration leads can view only mapped deal details and then read/write information in Strategy, IMO, Organization structure, Application inventory and execution plans based on the module that is accessible. Further, there is also a process by which other users like the Global Head can use the application, wherein the application when enabled allows a global head to at a glance view of all the deal as well as their respective dashboards and status reports.

In reference to the above process flow, the steps/components for implementing the technical flow mentioned above are described below. In an embodiment, the proposed system allows hosting on cloud, wherein the application instance can be created specific to deal and hosted on Cloud with pay-per deal business model. Further, the proposed system allows identifying stakeholders wherein, there shall be several stakeholders across both the entities—parent organization and target organization and further helps to identify the roles required for the successful execution of post-merger integration. The system further helps in defining deal details, wherein the specifics of the deals have to be entered such as the nature of the deal, size of the deal, preferred timelines, and priority of geographic roll outs. The system further helps in defining roles and responsibilities, wherein the roles required for the execution of a program are prepopulated and respective responsibilities are pre-configured. Domain knowledge database that can be customized. further allows the users to add additional customized roles and responsibilities, if required. The system further allows re-populated and editable questionnaire, wherein offers a library of required questions to capture the integration details across various functional and business tracks. The system further allows to capture responses to the questionnaire and enables single version of truth across all the stakeholders in the ecosystem. Further, these responses can be used to build an integration model repository for all future engagements and infuse AI/ML capability to run the programs autonomously. Further the system recommends preferred mode of integration (one amongst the 6 options—Clone, Purge and Merge, Clone-Acquire, Purge and Merge, Acquire and Merge, Develop New Systems, Develop Interfaces, Pick Best of Breed and Purge) Further, the system allows tag Global roll-out and application inventory, wherein this will be an extended feature that can be used in managing global roll-out programs and can also be used as a standalone feature.

The proposed system may be embodied in a digital play book for the entire M&A process which will help in the activities of capturing knowledge of processes technologies, people and scenarios in a central digital location. Further the system helps in workshops for M&A strategy, execution and makes things independent of people. Further, the system is secure, trusted and access controlled and may help in Testing and Go-Live scenarios. Further, the system may help in companies to capture knowledge once and reuse the knowledge for their future integration programs thereby forming repeatable integration models. Further, the system can also be used as an independent tool for planning and executing global rollouts wherein, as this is deal-specific instance, data resides in customer's location and abides to data privacy and security principles. The system provides further extended features which includes estimation, controlling, tracking, having intelligent conversational system interface and bringing on block chain. The Technology levers include on-cloud, easy and intuitive User Interface backed with Machine learning for all future scalability. The clear gap of disparate planning systems and complex decisions is addressed and mitigated on the system. On the whole, the system helps in bringing about certainty to M&A integration programs and helps manage projects in time, cost and quality. The proposed platform helps in keeping track of all activities, wherein all data and status of integrations may be visible to every stakeholder helping to pre-empt delays and take corrective action in advance. Further, the repository stores information in one place, the time spent on collecting, validating and using the data is saved tremendously (up to 18%).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Hence the proposed system is a complete solution for integrating multiple entities end to end and also for recommending the best option to realize synergies faster without manual intervention for any application domain.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   extracting, using one or more text mining models, metadata associated with at least one category of each entity of a plurality of entities participating in a deal via one or more hardware processors, from a plurality of data sources associated with the plurality of entities, wherein the plurality of data sources accessible through a cloud infrastructure;
   dynamically configuring, via the one or more hardware processors, an assessment for the at least one category based on the metadata by using a set of Natural Language Processing (NLP) rules, the assessment comprising a plurality of parameters associated with a data integration of the plurality of entities, wherein the assessment being administered to a plurality of users from the plurality of entities to obtain a plurality of responses to the assessment from the plurality of users;
   assigning, by using an artificial intelligence (AI) based processing model, a similarity score to the plurality of responses, via the one or more hardware processors, wherein the similarity score is indicative of extent of match between distinct response obtained from the plurality of entities; and
   recommending, by a recommendation engine, a data integration model from amongst a plurality of data integration models for the deal based on the similarity score, via the one or more hardware processors.

2. The method of claim 1, wherein the deal comprises one of a merger and an acquisition between the plurality of entities participating in the deal.

3. The method of claim 1, wherein a category of the at least one category comprises one of people, processes, technologies and software applications of the each entity.

4. The method of claim 3, further comprising systematically storing the metadata in a database classified based on the people, the processes, the technologies and the software applications to be accessible based on function and access granted as a single version of truth.

5. The method of claim 1, wherein the one or more text mining models comprises Named Entity Recognition, Entity Resolution, and Key Entity Detection.

6. The method of claim 1, wherein the AI based processing model is pretrained using a supervised learning technique.

7. The method of claim 1, wherein the AI based processing model is pretrained using a transfer learning technique.

8. The method of claim 1, wherein the plurality of integration models comprises a clone model, a purge and merge model, a clone-acquire model, a develop new systems model, a develop interfaces model, a pick best of breed and purge model, and combinations thereof.

9. A system (300) for data integration, comprising:
   one or more memories (315); and
   one or more hardware processors (302), the one or more memories (315) coupled to the one or more hardware processors (302), wherein the one or more hardware processors (302) are configured to execute programmed instructions stored in the one or more memories (315), to:
   extract, using one or more text mining models, metadata associated with at least one category of each entity of a plurality of entities participating in a deal, from a plurality of data sources associated with the plurality of entities, wherein the plurality of data sources accessible through a cloud infrastructure;
   dynamically configure an assessment for the at least one category based on the metadata by using a set of Natural Language Processing (NLP) rules, the assessment comprising a plurality of parameters associated with the data integration of the plurality of entities, wherein the assessment being administered to a plurality of users from the plurality of entities to obtain a plurality of responses to the assessment from the plurality of users;

assign, by using an artificial intelligence (AI) based processing model, a similarity score to the plurality of responses, wherein the similarity score is indicative of extent of match between distinct responses obtained from the plurality of entities; and recommend, by a recommendation engine, a data integration model from amongst a plurality of data integration models for the deal based on the similarity score.

10. The system of claim 9, wherein the deal comprises one of a merger and acquisition between the plurality of entities participating in the deal.

11. The system of claim 9, wherein a category of the at least one category comprises one of people, processes, technologies and software applications of the each entity.

12. The system of claim 11, wherein the one or more hardware processors are further configured by the instructions to systematically store the metadata in a database classified based on the people, the processes, the technologies and the software applications to be accessible based on function, and wherein the one or more hardware processors are further configured by the instructions to grant the access as a single version of truth.

13. The system of claim 9, wherein the one or more text mining models comprises Named Entity Recognition, Entity Resolution, and Key Entity Detection.

14. The system of claim 9, wherein the AI based processing model is pretrained using a supervised learning technique.

15. The system of claim 9, wherein the AI based processing model is pretrained using a transfer learning technique.

16. The system of claim 9, wherein the plurality of integration models comprises a clone model, a purge and merge model, a clone-acquire model, a develop new systems model, a develop interfaces model, a pick best of breed and purge model, and combinations thereof.

17. One or more non-transitory machine readable information storage mediums comprising one or more instructions which when executed by one or more hardware processors cause:

extracting, using one or more text mining models, metadata associated with at least one category of each entity of a plurality of entities participating in a deal via one or more hardware processors, from a plurality of data sources associated with the plurality of entities, wherein the plurality of data sources accessible through a cloud infrastructure;

dynamically configuring, via the one or more hardware processors, an assessment for the at least one category based on the metadata by using a set of Natural Language Processing (NLP) rules, the assessment comprising a plurality of parameters associated with a data integration of the plurality of entities, wherein the assessment being administered to a plurality of users from the plurality of entities to obtain a plurality of responses to the assessment from the plurality of users;

assigning, by using an artificial intelligence (AI) based processing model, a similarity score to the plurality of responses, via the one or more hardware processors, wherein the similarity score is indicative of extent of match between distinct response obtained from the plurality of entities; and recommending, by a recommendation engine, a data integration model from amongst a plurality of data integration models for the deal based on the similarity score, via the one or more hardware processors.

* * * * *